US012595689B2

(12) United States Patent
Hunt et al.

(10) Patent No.: US 12,595,689 B2
(45) Date of Patent: Apr. 7, 2026

(54) MOTOR VEHICLE LOCK, IN PARTICULAR MOTOR VEHICLE SIDE DOOR LOCK

(71) Applicant: Kiekert AG, Heiligenhaus (DE)

(72) Inventors: Robert J. Hunt, Davisburg, MI (US); Scott Brown, Livonia, MI (US)

(73) Assignee: Kiekert AG, Heiligenhaus (DE)

( * ) Notice: Subject to any disclaimer, the term of this patent is extended or adjusted under 35 U.S.C. 154(b) by 85 days.

(21) Appl. No.: 18/363,938

(22) Filed: Aug. 2, 2023

(65) Prior Publication Data

US 2025/0043599 A1 Feb. 6, 2025

(51) Int. Cl.
*E05B 81/06* (2014.01)
*E05B 81/30* (2014.01)
*E05B 81/34* (2014.01)

(52) U.S. Cl.
CPC .............. *E05B 81/06* (2013.01); *E05B 81/30* (2013.01); *E05B 81/34* (2013.01); *E05Y 2201/224* (2013.01); *E05Y 2900/531* (2013.01)

(58) Field of Classification Search
CPC .......... E05B 81/06; E05B 81/30; E05B 81/34; E05Y 2201/224; E05Y 2900/531
USPC ........................................................... 70/237
See application file for complete search history.

(56) References Cited

U.S. PATENT DOCUMENTS

| | | | | |
|---|---|---|---|---|
| 6,988,749 | B2 * | 1/2006 | Hashiba | E05B 81/54 292/216 |
| 11,072,949 | B2 * | 7/2021 | Strole | B62D 33/037 |
| 2016/0312499 | A1 * | 10/2016 | Fannon | E05B 81/06 |
| 2017/0089103 | A1 * | 3/2017 | Ottino | E05B 81/06 |
| 2020/0408007 | A1 | 12/2020 | Jeong | |
| 2021/0372169 | A1 * | 12/2021 | Patane | E05B 81/66 |
| 2022/0145675 | A1 | 5/2022 | Okawa et al. | |
| 2024/0003169 | A1 * | 1/2024 | Zejda | E05B 81/34 |
| 2024/0133217 | A1 * | 4/2024 | Yokota | E05B 81/06 |
| 2024/0376754 | A1 * | 11/2024 | Szegeny | E05B 81/30 |

FOREIGN PATENT DOCUMENTS

| | | | | |
|---|---|---|---|---|
| CN | 113914727 | A * | 1/2022 | |
| DE | 102019109488 | A1 | 10/2020 | |
| DE | 102020118721 | A1 | 1/2022 | |
| DE | 102021123328 | A1 | 3/2023 | |
| EP | 3812541 | A1 * | 4/2021 | E05B 81/15 |
| WO | 2022012709 | A1 | 1/2022 | |

* cited by examiner

*Primary Examiner* — Kristina R Fulton
*Assistant Examiner* — James Edward Ignaczewski
(74) *Attorney, Agent, or Firm* — Renner, Otto, Boisselle & Sklar, LLP

(57) ABSTRACT

A motor vehicle door lock having a locking mechanism with a rotary latch and at least one pawl, wherein the rotary latch can be engaged in at least one engaging position by means of the pawl; a release lever, wherein the locking mechanism can be transferred from the engaging position to a release position by means of the release lever; an electrical drive unit and an actuating lever, wherein the actuating lever can be actuated by the drive unit and the locking mechanism can be unlocked at least indirectly by means of the actuating lever, wherein the actuating lever and a gearwheel of the drive unit can be mounted on a common shaft.

17 Claims, 1 Drawing Sheet

MOTOR VEHICLE LOCK, IN PARTICULAR MOTOR VEHICLE SIDE DOOR LOCK

FIELD OF DISCLOSURE

The invention relates to a motor vehicle lock, and in particular a motor vehicle door lock, having a locking mechanism with a rotary latch and at least one pawl, wherein the rotary latch can be engaged in at least one engaging position by means of the pawl; a release lever, wherein the locking mechanism can be transferred from the engaging position into a release position by means of the release lever; and an electrical drive unit and an actuating lever, wherein the actuating lever can be actuated by the drive unit, and the locking mechanism can be unlocked at least indirectly by means of the actuating lever.

BACKGROUND OF DISCLOSURE

In modern motor vehicle locking systems, locking mechanisms are primarily installed which engage with one another by the rotary latch and the pawl interlocking with each other, therefore enabling a fixation of a component that is movably disposed on the motor vehicle. In the following, the terms "motor vehicle locking system", "motor vehicle lock", "door lock" or "lock" are used synonymously. Depending upon the arrangement in the motor vehicle, single-stage or two-stage locking mechanisms are used. While it is more common to use single-stage locking mechanisms in covers or hatchbacks, the legislators oblige the vehicle manufacturers to equip side doors with two-stage locking mechanisms. In a first step, i.e., in a first engaging position, the side door is held loosely, and in a second step, i.e., in a second engaging position, the side door is in a completely closed operating position. The first engaging position is referred to here as pre-engagement and the second engaging position as the main engagement.

In order to further increase the comfort in motor vehicles, more and more electrically-assisted functions are used in motor vehicles. In motor vehicle locking systems, electric motors are installed which then enable, for example, an electrical unlocking of the locking mechanism. The electric motor usually interacts with a gear mechanism, wherein the gear stage then initiates an unlocking of the locking mechanism indirectly or directly. Such an electrical drive unit is known from DE 10 2019 109 488 A1, for example.

DE 10 2019 109 488 A1 discloses an electric drive unit consisting of an electric motor with a worm gear stage downstream of the electric motor. The gear wheel of the worm gear stage is equipped with a cylindrical lateral surface which extends as a ramp about an axis of rotation of the worm gear wheel. An actuation lever is in engagement with the lateral surface, wherein the actuation lever can, for example, cause or at least initiate an unlocking of a locking mechanism. By means of this electrical drive unit, the operator of the motor vehicle can, for example, electrically unlock the motor vehicle lock so that an electrically-assisted opening of a side door can be realized.

DE 10 2020 118 721 A1 discloses the generic prior art. A motor vehicle lock is disclosed having a locking mechanism with a rotary latch and at least one pawl, wherein the rotary latch can be latched in at least one engaging position by means of the pawl, a release lever, wherein the locking mechanism can be transferred from the engaging position into a release position by means of the release lever, and an electric drive unit for actuating the release lever. The actuating lever forms a part of the worm gear and is driven directly by the worm wheel. The release lever is directly connected to the actuating lever so that when the actuating lever rotates, the release lever is immediately actuated and releases the locking mechanism.

The solutions known from the prior art have proven of value so far. It is an ongoing aim of the automotive industry and therefore of developers to develop compact designs which are adaptable to the reduced space requirements in the motor vehicle. Furthermore, the reduction in the number of components can reduce the weight of the motor vehicle lock which represents a decisive advantage with regard to the electrification of the automobiles. This is where the invention starts from.

SUMMARY OF DISCLOSURE

The object of the invention is to provide an improved motor vehicle lock. In particular, the object of the invention is to provide a motor vehicle lock that provides the same or an improved functionality with a reduced number of components. In addition, the object of the invention is to provide a structurally simple and cost-effective solution for a motor vehicle lock with the same functionality.

The object is achieved by the features of independent claim 1. Advantageous embodiments of the invention are specified in the dependent claims. It should be noted, however, that the embodiments described below are not restrictive; rather, any variation of the features described in the description and the dependent claims is possible.

According to claim 1, the object of the invention is achieved in that a motor vehicle, in particular a motor vehicle door lock, is provided having a locking mechanism with a rotary latch and at least one pawl, wherein the rotary latch can be engaged in at least one engaging position by means of the pawl; a release lever, wherein the locking mechanism can be transferred from the engaging position into a release position by means of the release lever; and an electrical drive unit and an actuating lever, wherein the actuating lever can be actuated by the drive unit and the locking mechanism can be unlocked at least indirectly by means of the actuating lever, and wherein the actuating lever and a gearwheel of the drive unit can be mounted on a common shaft. The design according to the invention makes it possible to realize a compact design with a minimum number of components. In particular, the common mounting, that is to say the arrangement of the actuating lever and the gearwheel of the drive unit on a common shaft, offers the advantage that only one bearing point to achieve a release mechanism or part of the release mechanism can be realized in a very compact design. By using a single bearing point, the required installation space for actuating or releasing the release lever can be reduced to a minimum. This is particularly advantageous when there is little space available for the unit as a whole. In addition, the number of components required in the drivetrain can be reduced.

In another embodiment variant of the invention, an advantage results if the actuating lever can be formed integrally with the gearwheel. On the one hand, this allows backlash-free transmission of the drive torque from the gearwheel to the actuating lever and, on the other hand, further reduces the number of required components. This offers a time advantage in particular during assembly, i.e. production, which has an overall positive effect on the manufacturing costs of the motor vehicle lock. In any case, a single component can be used to transmit power from the drive to a downstream release lever.

A motor vehicle lock according to the invention is understood to also include such locks as are used in side doors, hatches, covers, or sliding doors, i.e., wherever components mounted movably on the motor vehicle must be fixed in a locking position in order to enable safe use of the motor vehicle. However, the motor vehicle lock according to the invention preferably relates to a motor vehicle side door.

The locking mechanism can be designed as a single-latch or double-latch locking mechanism. Recent developments have also disclosed locking mechanisms with rolling locking mechanism parts, such as a ratchet element arranged between the rotary latch and the pawl. In the case of a single-latch locking mechanism, there is only one engaging position in which the pawl holds the rotary latch in a main engaging position. In the case of double-latch locking mechanisms, there is, in addition to a main engaging position, also a pre-engaging position, so that the rotary latch and pawl can interact in two engaging positions. The release lever thereby interacts with the locking mechanism in such a way that the release lever disengages or unlocks the engaged locking mechanism. In this case, the pawl is moved out of the engagement region with the rotary latch or engaging element. It is known to also use several pawls. For example, when an opening torque for the locking mechanism arises in the main engaging position, the pawl can be held via another pawl, which is also termed a blocking lever. This further pawl is then referred to as an engaging or blocking lever.

The electric drive unit preferably consists of a DC motor, on the output shaft of which a gearwheel is mounted. A movement in the motor vehicle lock can be initiated by means of this gearwheel. Preferably, the gearwheel can be formed as part of a worm gear mechanism. Worm gear mechanisms have the advantage that short adjustment times of less than 100 ms are realized. Furthermore, sufficiently high forces can be transmitted by means of worm gears in order to provide sufficient force for actuating the actuating lever chain and in particular the release lever even in extreme situations. A worm arranged directly on the output shaft of the electric drive motor engages the worm gear and, in an advantageous embodiment variant, directly moves the actuating lever formed on the worm gear. The actuating lever can then be used to move the release lever so that the locking mechanism can be directly unlocked. Rapid adjustment times coupled with a minimum number of components in the actuating lever chain bring about a backlash-free transmission of the actuating torque of the drive motor. Rapid adjustment times with small tolerances in the actuating lever chain can therefore enable rapid and quiet release or unlocking of the locking mechanism.

If the shaft can be held in a housing of the motor vehicle lock and/or a reinforcement plate and/or a lock case, another improvement of the motor vehicle lock according to the invention can be realized. Advantageously and in a simplest embodiment, the shaft for receiving the gear and the actuating lever can be accommodated in the motor vehicle lock housing and in the lock case. The components, the lock case and motor vehicle lock housings, are available so that no further components have to be provided for mounting the shaft in the motor vehicle lock. This in turn offers the advantage that a high functionality in the motor vehicle lock can be produced with a minimum number of components.

In a development of the motor vehicle lock, the shaft can additionally be formed as a bearing point for the pawl. Here, a significant advantage of the structure of the motor vehicle lock according to the invention becomes apparent, namely that the shaft assumes a multifunctionality. On the one hand, the shaft serves to receive the drive gear and the actuating lever, that is to say the actuating device, and at the same time the shaft can bear the locking mechanism. A minimum of components for the locking mechanism and the release mechanism are therefore used. The drive unit and also parts of the locking mechanism can be accommodated by means of the shaft.

In addition, if the bearing point for the pawl is arrangeable between a reinforcement plate and a lock case, the motor vehicle lock according to the invention can be further improved. The arrangement of the pawl between the reinforcement plate and the lock case offers a decisive advantage. Due to the multifunctionality of the shaft, the shaft requires a stable bearing point. By arranging the pawl between the lock case and the reinforcement plate consisting of metal, a sufficiently stable bearing for the shaft and, in particular, the drive unit mounted on the shaft can be kept precise and tolerance-free. The shaft can advantageously be riveted to the lock case so that an unreleasable connection can be established between the shaft and the lock case. This is necessary, in particular, because the interaction in the locking mechanism can be influenced by the bearing of the shaft. On the one hand, a continuous stability of the locking mechanism must be ensured and, on the other hand, the tolerances in the interaction of the rotary latch and pawl or latching element and pawl can be maintained or reduced to a minimum by the fixed mounting of the pawl.

In another development of the invention, the shaft is formed at least in regions from a metallic material. The lock case as well as the reinforcement plate enclose the pawl. If the shaft is now likewise formed from a metallic material at least in regions and in particular in the region of the bearing of the pawl, a highly precise and stable bearing for the pawl can be provided. The shaft is consequently held directly between the lock case and the reinforcement plate. In this case, it can be advantageous if the shaft is undetachably connected at least to the lock case, for example by means of riveting.

If the shaft has at least one shoulder for bearing the pawl, the stability and the functionality of the locking mechanism and therefore of the motor vehicle lock can be improved overall. For riveting the shaft to the lock case, the lock case can have a depression in which an insertion opening for the shaft is formed. The rivet head therefore forms a planar surface with the overall extension of the lock case. The rivet head consequently sinks into the recess in the lock case. This depression or elevation in the lock case can be used for the abutment of the pawl inside the motor vehicle lock. This provides a guide surface for the pawl through the lock case.

If, according to the invention, a shoulder is formed on the shaft, this shoulder, which forms an enlarged diameter of the shaft, can form another abutment surface for the bearing of the pawl in the motor vehicle lock. The pawl can then be guided over the recess in the lock case and the shoulder in the shaft. The abutment surface on the pawl can then be adjustable by the width or the diameter of the shaft or of the shoulder. This can ensure that the pawl is supported on both sides by the shaft. At the same time, the shoulder can serve for receiving the reinforcement plate, so that the shoulder has two functions. On the one hand, the shoulder serves as an abutment and guide surface for the pawl and, on the other hand, an abutment surface for supporting the reinforcement plate can be provided by the shoulder. As a result of the very stable bearing of the pawl and the arrangement between the metal parts of the lock, an extremely stable bearing for the gearwheel of the drive and also of the actuating lever can additionally be provided. The drivetrain can additionally be stabilized by a third bearing of an axial end of the shaft in the lock housing.

Another embodiment of the invention can be achieved in that the shaft is formed at least in regions from plastic, in particular from a plastic cover. If the shaft is at least in regions provided with a plastic cover and/or is in regions formed completely from plastic, on the one hand a lightweight shaft can be provided and on the other hand a good bearing for the drive elements and/or the pawl can be provided due to a corresponding surface-slip property of the plastic. The shaft is fixedly arranged in the motor vehicle lock and, on the one hand, supports parts of the locking mechanism and parts of the drivetrain. Depending on the requirements made of the corresponding parts on the shaft, a metallic surface or a surface made of plastic can consequently be provided for the mounting.

A stop surface for the gearwheel and the actuating lever can be provided by the reinforcement plate. In this embodiment, the gearwheel or the actuating lever located on the gearwheel extends up to the reinforcement plate so that, along the longitudinal extension of the shaft, the reinforcement plate provides a guide surface for the drive means. Due to the extension of the gearwheel or the combination of the gearwheel and the actuating lever up to the reinforcement plate, a free space can be provided, into which, for example, a release lever can engage. This facilitates the interaction between the actuating lever and the release lever, since a form-fit connection can be realized in a structurally simple manner in an overlapping region between the actuating lever and the release lever. As a result of the extension on the gearwheel or the combination of the gearwheel and the actuating lever, a free space can be created which promotes the compact structure of the motor vehicle lock overall. A compact design with a minimum number of components with a constant functionality can be realized by the design of the motor vehicle lock according to the invention.

BRIEF DESCRIPTION OF DRAWINGS

The invention is explained in more detail below with reference to the accompanying drawings on the basis of a preferred embodiment. However, the principle applies that the exemplary embodiment does not limit the invention, but is merely an advantageous embodiment. The features shown can be implemented individually or in combination with further features of the description as well as the claims-individually or in combination.

In the figures.

DETAILED DESCRIPTION

Figure 1:
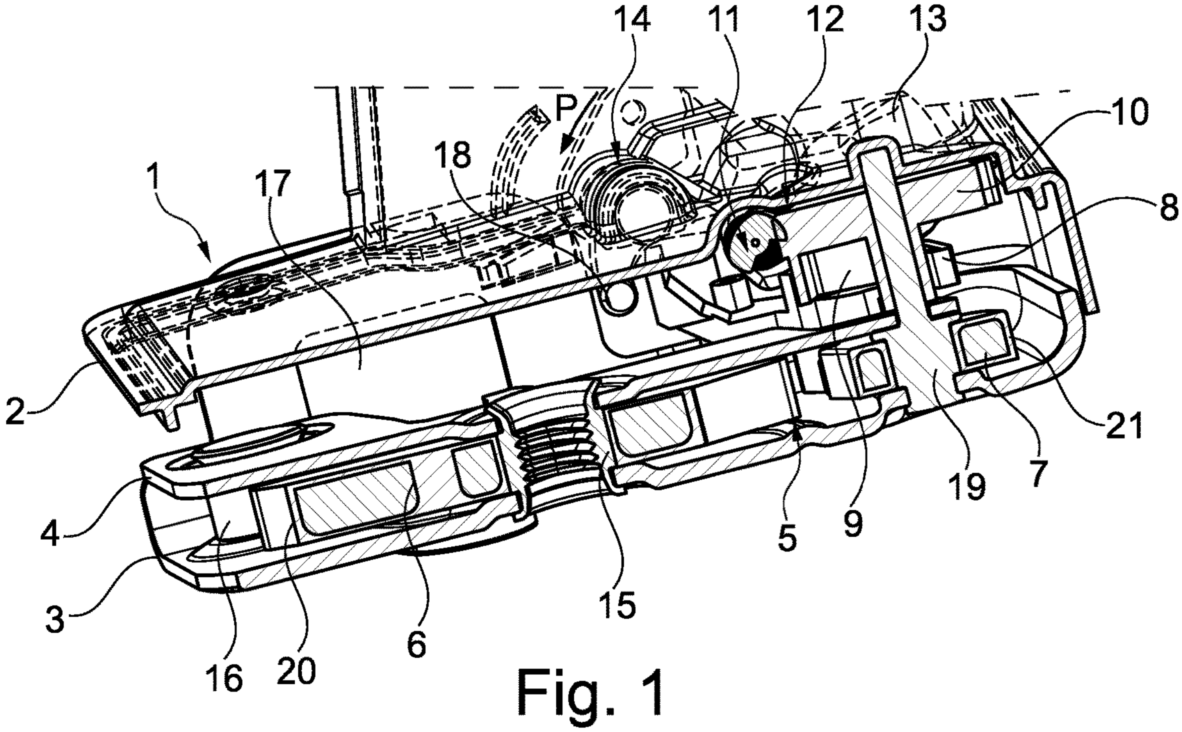
FIG. 1 shows a three-dimensional view of a motor vehicle lock shown in parts in section and designed according to the invention.

FIG. 1 shows a motor vehicle lock 1 designed according to the invention in a three-dimensional view and only with the components necessary for the invention. The motor vehicle lock is enclosed by a lock housing 2 formed from plastic and by a metal lock case 3. A reinforcement plate 4 is arranged between the lock housing 2 and the lock case 3, wherein the reinforcement plate extends parallel to the lock case 3 in the motor vehicle lock 1. A locking mechanism 5 is shown here consisting of a catch 6 and a pawl 7. A release lever 8 is arranged above the lock case 3, wherein the release lever can be brought into engagement with an actuating lever 9. The actuating lever 9 in turn is integrally formed with a worm gear 10, wherein the worm gear 10 forms a worm gear mechanism 12 in combination with the worm gear 11. The worm gear 11 is in turn mounted on a shaft of an electric drive 13. An internal or external actuating lever 14, which is mounted pivotably in the lock housing 2, can also be seen. The catch 6 is mounted in a shaft 15 designed as a threaded bush 15. A further threaded bush 16 serves on the one hand for mounting the motor vehicle lock 1 as also the threaded bush 15, and simultaneously carries the reinforcement plate. The threaded bushes 15, 16 are non-detachably connected to the lock case 3 and the reinforcement plate 4, for example by means of hot-forming or riveting. FIG. 1 shows the inlet region 17 for a lock holder, so that an interaction between the rotary latch and the lock holder is possible.

The open position of the motor vehicle lock 1 is shown, i.e. the rotary latch is in an open position and is disengaged from the pawl 7. If the motor vehicle lock is brought into engagement with the lock holder, the rotary latch 6 pivots about the bearing point 15 and can engage with the pawl 7 in a spring-loaded manner. A motor vehicle lock 1 in the form of a side door lock is shown, so that a pre-latching and a main latching position of the locking mechanism 5 is possible in the shown motor vehicle lock.

To unlock the locking mechanism, the release lever 8 can be actuated, for example, by means of manual actuation of the internal or external actuating lever 14 so that the pawl 7 is disengaged from the rotary latch 3, so that the locking mechanism 5 is unlocked. For this purpose, the internal or external actuating lever 14 is pivoted in the counterclockwise direction in the direction of the arrow P, as a result of which an actuating arm 18 comes into engagement with the release lever 8 and pivots the release lever 8 in the clockwise direction in the shown exemplary embodiment. To unlock the locking mechanism, a control signal can also be applied to the electric drive 13, as a result of which the worm 11 is actuated and the worm gear 10 is pivoted clockwise about the shaft 19. The worm gear 10 is integrally formed with the actuating lever 9, wherein the actuating lever 9 is also able to pivot the release lever 8 clockwise by the movement of the worm gear 10, so that the locking mechanism 5 can be electrically unlocked.

It also remains to be noted here that the locking mechanism parts 6, 7 have a plastic cover 20, 21 which, on the one hand, serve for bearing the locking mechanism parts 6, 7 and to minimize noise.

Figure 2:
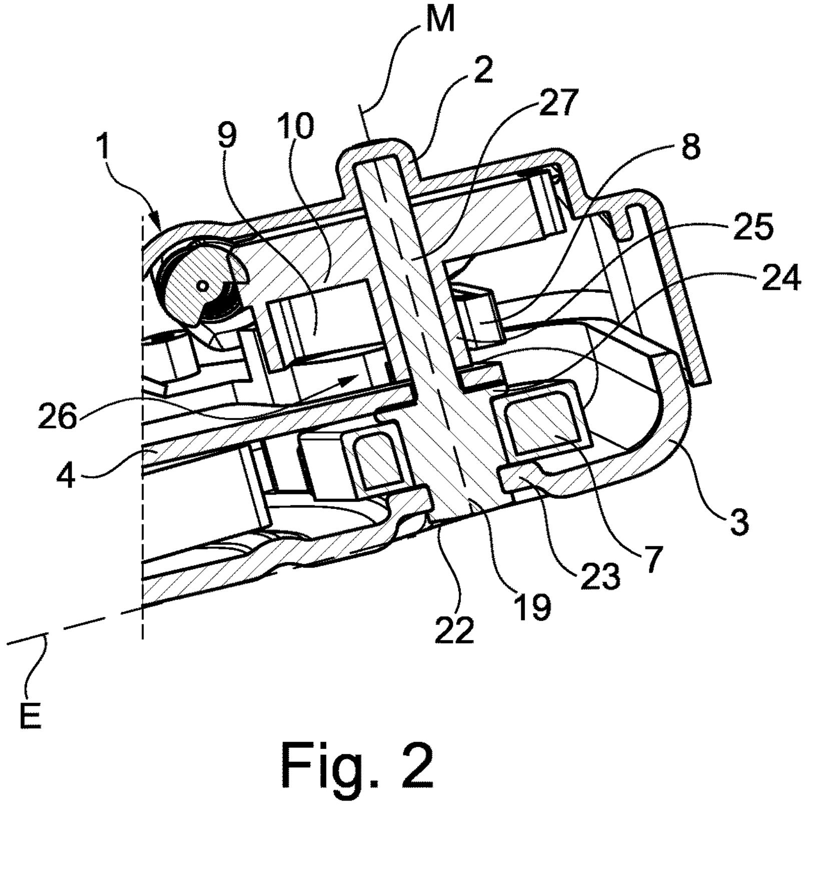
FIG. 2 shows a detail view of the shaft of the motor vehicle lock according to FIG. 1.

FIG. 2 shows an enlarged view of the shaft 19 of the motor vehicle lock 1. It can be seen that the shaft 19 is accommodated in the lock housing 2 at one end and in the lock case 3 at an opposite end. A rivet head 22 makes clear the non-releasable connection between the lock case 3 and the shaft 19. A depression 23 is also visible in the lock case 3, wherein the recess 23 serves to accommodate the rivet head 22, so that the lock case 3 overall forms a plane E which forms a plane E with the rivet head 22.

The shaft 19 also has a shoulder 24, wherein the shoulder 24 has an effect on both sides. On the one hand, the pawl 7 abuts the shoulder 24 so that the pawl can be securely fixed or borne between the depression 23 and the shoulder 24. However, the shoulder 24 also serves as an abutment surface for mounting the reinforcement plate 4. The reinforcement plate 4 in turn interacts with an extension 25 on the gearwheel 10 or actuating lever 9. The extension 25 forms a free space 26 into which the release lever 8 can engage so that a secure interaction between the actuating lever and the release lever and in particular a form-fit interaction between the release lever and the actuating lever 9 can be realized. The reinforcement plate 4 consequently has a dual function. On the one hand, the reinforcement plate serves for fixing or fixedly bearing the locking mechanism parts 6, 7, and on the other hand the reinforcement plate serves as a guide surface for the drive element consisting of gearwheel 10 and actuating lever 9. In an advantageous manner, the shaft 19 in the region of the locking mechanism parts 6, 7 is metallic, whereas the axial extension 27 along a center line M of the shaft 19 can be formed at least in regions or completely from plastic. Low weights, good surface-slip properties and a high stability of the shaft can thus be combined. A compact design with high functionality offers an advantage that improves the overall motor vehicle lock 1.

LIST OF REFERENCE SIGNS

1 Motor vehicle lock
2 Lock housing
3 Lock case
4 Reinforcement plate
5 Locking mechanism
6 Rotary latch
7 Pawl
8 Release lever
9 Actuating lever
10 Worm gearwheel
11 Worm gear
12 Worm gear mechanism
13 Drive
14 Internal or external actuating lever
15, 16 Threaded bush
17 Inlet mouth
18 Actuating arm
19 Shaft
20, 21 Plastic cover
22 Rivet head
23 Recess
24 Shoulder
25 Extension
26 Free space
27 Axial extension
P Arrow
E Plane
M Center axis

The invention claimed is:

1. A motor vehicle lock comprising:

a locking mechanism with a rotary latch and a pawl, wherein the rotary latch is engaged in at least one engaging position by the pawl;

a release lever, wherein the locking mechanism is transferred from the engaging position to a release position by the release lever; and an electrical drive unit and an actuating lever, wherein the actuating lever is actuated by the drive unit and the locking mechanism is unlocked at least indirectly by the actuating lever, and wherein the actuating lever and a gearwheel of the drive unit are mounted on a common shaft such that the common shaft is a bearing point for the actuating lever and the gearwheel, wherein the pawl is pivotably mounted on the common shaft such that the common shaft is further a bearing point for the pawl.

2. The motor vehicle lock according to claim 1, wherein the actuating lever is formed integrally with the gearwheel.

3. The motor vehicle lock according to claim 1, wherein the gearwheel is part of a worm gear mechanism.

4. The motor vehicle lock according to claim 1, wherein the common shaft is held in a housing and/or a reinforcement plate and/or a lock case of the motor vehicle lock.

5. The motor vehicle lock according to claim 1, further comprising a reinforcement plate and a lock case, wherein the bearing surface for the pawl is arranged between the reinforcement plate and the lock case.

6. The motor vehicle lock according to claim 1, wherein the common shaft is formed at least in regions from a metallic material.

7. The motor vehicle lock according to claim 1, wherein the common shaft has at least one shoulder for bearing the pawl.

8. The motor vehicle lock according to claim 1, wherein the common shaft is formed at least in regions from plastic.

9. The motor vehicle lock according to claim 1, further comprising a stop surface for the gearwheel and the actuating lever.

10. The motor vehicle lock according to claim 9, wherein the stop surface is an extension on the gearwheel and/or the actuating lever.

11. The motor vehicle lock according to claim 10, further comprising a reinforcement plate, and the extension extends toward the reinforcement plate.

12. The motor vehicle lock according to claim 5, wherein the common shaft is unreleasably connected to the lock case.

13. The motor vehicle lock according to claim 7, wherein the shoulder is an enlarged diameter portion of the common shaft that provides an abutment surface for bearing the pawl.

14. The motor vehicle lock according to claim 13, further comprising a reinforcement plate, wherein the shoulder further provides another abutment surface for supporting the reinforcement plate.

15. The motor vehicle lock according to claim 8, further comprising a plastic cover, and at least a portion of the common shaft is part of the plastic cover.

16. The motor vehicle lock according to claim 1, further comprising a lock case including a depression, wherein the depression is shaped to accommodate a rivet head of the common shaft such that the lock case forms a plane with the rivet head.

17. The motor vehicle lock according to claim 16, wherein the common shaft has at least one shoulder for bearing the pawl, and wherein the pawl is arranged between the depression of the lock case and the shoulder such that the depression provides a guide surface for the pawl through the lock case.

* * * * *